United States Patent [19]

Tanaka

[11] Patent Number: 4,912,595
[45] Date of Patent: Mar. 27, 1990

[54] SIMPLE HIGH TENSION CAPACITOR

[75] Inventor: Kuzuo Tanaka, Kamagaya, Japan

[73] Assignee: Kabushiki Kaisha Route Six, Tokyo, Japan

[21] Appl. No.: 360,002

[22] Filed: Jun. 1, 1989

[30] Foreign Application Priority Data

Jun. 20, 1988 [JP] Japan .................................. 63-81293
Aug. 11, 1988 [JP] Japan ................................ 63-106303
Jan. 11, 1989 [JP] Japan ...................................... 1-1772

[51] Int. Cl.⁴ .......................... H01G 4/42; H01G 7/00
[52] U.S. Cl. .................................... 361/306; 29/25.42
[58] Field of Search ............... 29/25.42; 361/306, 321, 361/311, 312, 313, 322, 324, 275

[56] References Cited

U.S. PATENT DOCUMENTS

| 1,497,449 | 6/1924 | Kempton | 361/324 |
| 2,266,811 | 12/1941 | Ruben | 361/312 X |
| 2,463,765 | 3/1949 | Grouse et al. | 361/322 X |
| 2,991,540 | 7/1961 | Gaut | 29/25.42 X |
| 3,090,895 | 5/1963 | Hall | 361/306 X |
| 3,133,238 | 5/1964 | Barker et al. | 361/275 X |
| 3,259,857 | 7/1966 | Garstang | 361/322 X |
| 3,986,084 | 10/1976 | Carter et al. | 361/306 X |

*Primary Examiner*—Donald A. Griffin
*Attorney, Agent, or Firm*—Ladas & Parry

[57] ABSTRACT

The simple, high-voltage capacitor for this invention has larger electrostatic capacitance than that of existing high-voltage condensers. It is easily supplied to ignition systems of internal combustion engines for automobiles and electric generators.

This invention embodies a simple, high-voltage capacitor, (5) the body of which consists of aggregated sheets, an electrical insulator (1), a metal foil (2), another electrical insulator (3), and another metal foil (4). These sheets can be folded or wrapped for joining to high-voltage supply cords (12) or terminal plugs (14). The invention can also be used for application that requires grounding if the condenser body connects to (5) a grounding lead wire (8).

6 Claims, 3 Drawing Sheets

SIMPLE HIGH TENSION CAPACITOR

The high-voltage cable conventionally used for electronic ignition systems or high-voltage circuits in the internal combustion engines of automobiles or small electric generators tends to sustain deterioration of quality in metal wrapping or outer filmy coating of the cable. Surface deterioration results from a number of factors: moisture, humidity, various gases, chemicals, physical vibration, tensile force, bend radius, and poor installation. As a result, insulation decays, voltage drops, and even when a cable is new, voltage will fluctuate.

One attempt to solve this problem was a device that reduced electrical voltage fluctuations and stabilized power supply attaching a condenser to a high voltage circuit. The device was impractical. Since the device had to connect to the load side, electrical insulation was poor. Worse yet, the device could not connect to the existing electrical circuit because if the condenser's electrostatic capacity was increased, the device became too large.

This invention offers a simple, high-tension capacitor of larger electrostatic capacitance than that of existing high voltage capacitors. It can easily join to the high-voltage cable of electrical ignition systems or high-voltage circuits in the internal combustion engines of automobiles and engine generators.

The attached drawings show examples of practical applications of this invention.

Figure 1:
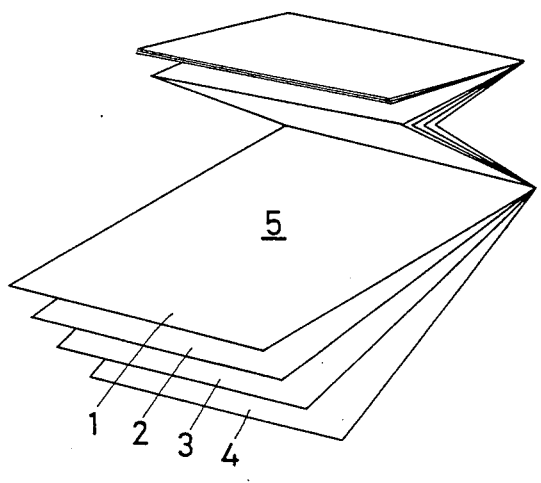
FIG. 1 is an oblique view of the condenser body (5) of the simple, high-voltage capacitor showing the manner in which it is folded.

(1) Electrical insulator
(2) Metal foil
(3) Electrical insulator
(4) Metal foil
(5) Condenser body
(6) Wrapping material
(7) Folded flap
(8) Lead wire
(9) Electrical conductor
(10) Electrical insulator
(11) Wrapper
(12) High-voltage supply cord
(13) High-voltage supply cord with a condenser
(14) Terminal plug
(15) Hollow metal tube
(16) Terminal plug with a high-voltage, non-grounding condenser
(17) Hollow electrical insulator
(18) Terminal plug with a condenser
(19) Electrical insulator
(20) High-voltage cable This application describes the construction of the simple, high-tension capacitor of this invention which is designed to meet the stated purpose. All numbers in parentheses refer to the drawings. First, a condenser body (5) is composed of aggregated layer sheets—an electrical insulator (1), a metal foil (2), another electrical insulator (3), and another metal foil (4), each layer is laid one upon the other in ordinal order, as shown in the attached drawings. The total layers are folded more than once so that the metal foil (4) is the outer layer. Finally the entire body of the aggregate is coated with wrapping material (6).

Second. a condenser body (5) is composed of an aggregated layer, an electrical insulator sheet (1), a metal foil (2), another electrical insulator sheet (3), and another metal foil (4). Each sheet is laid one upon the other in ordinal order; the layers are wound more than once around so that the metal foil (4) shows as the outer layer; the flapping end of the aggregate layer called "folded flap" (7), is folded back, pressed flat, and positioned at the top of the body (5). Finally the whole body is coated with wrapping material (6).

Third, a simple high tension capacitor has a lead wire (8), fixed to the sheet of metal foil (4), of the condenser body (5) as shown; the body (5) is folded into more than one layer, with the the metal foil wound in more than one round (4), so that it shows as the outer layer of the body (5). The flapping part at the end of the metal foil (4) turns back to form the "folded flap" (7). The folded flap is pressed flush and positioned at the top of the body (5). Finally the whole body is coated with wrapping material (6).

Fourth, a high-voltage, stable power supply cord has a simple, high-tension capacitor which embodies aggregate layer sheets—a metal foil (2), an electrical insulator (3), a metal foil (4) and electrical insulator (3')—laid in ordinal order and wound more than once around the periphery of the existing high voltage supply cord (12). This power supply cord consists of a conductive wire (9), an electrical insulator (10) and an external wrapper (11). The lead is folded back and pressed flush with the folded flap (7) positioned at the top of the body (5), making a high voltage supply cord (13) with a condenser in it. The whole body is coated with wrapping material (6).

Fifth, a high voltage non-grounding capacitor is assigned to a terminal plug (16). The terminal plug (14) is inserted into the hole of the hollow metal tube (15). One end of the metal foil (2) joins to the periphery of a hollow metal tube (15), the aggregate layer, composed of an electrical insulator (3), a metal foil (4), an electric insulator (3'), a metal foil (4') and an electrical insulator (3'). Laid in said order, is wound more than once around and fixed to the metal foil (2), making a terminal plug (16) with a high voltage non-grounding condenser, and the periphery of the terminal plug (16) is coated with wrapping material (6).

Sixth, a simple high tension capacitor is used for the terminal plug. The terminal plug (14) is inserted into the hollow metal tube (15), the hollow metal tube (15) fits into the hollow of the hollow insulator tube (17). The aggregate layer, composed of a metal foil (2), an electrical insulator (3), and a metal foil (4), laid in said order, is wound at the periphery of the layers to produce a "terminal plug (18) with a condenser in it". A grounding lead wire (8) is fixed at one end of the metal foil sheet (4), an electric insulator (19), is wound firmly around the metal foil (4), and finally, the entire body is coated with wrapping material (6).

This invention applies to simple, high-tension capacitors in which the condenser body (5) is folded in more than one layer and coated with wrapping material (6). The condenser body (5) is wound more than once around and covered with a wrapping material (6), or in which the condenser body (6) is wound more than once, and the end of the metal foil (4) in the aggregated layer is folded back and positioned at the top. The entire body can be folded many times and is covered with a wrapping material (6). The body supports a high voltage cable, or joins firmly to fixtures to the cable. If this simple, high-tension capacitor has a grounding lead wire (8) fixed to the body, it can be used for grounding.

High voltage flowing to distributors generates a potential difference between the outside of the conductor and the coating (wrapper) of the cable by static induction. In other words, with each potential difference, electrostatic capacity is generated between the electrical insulator (1) and the metal foil (4). For example, in the simple high tension capacitor provided with the lead wire (8), the conductor in the high voltage cable or distributor's cable turns out to bear a (+) load, at which time the outside of the coating wrapper and the insulator (1) turn out to be inductors. The metal foil (2) bears a low (+) load, the insulator (3) becomes an inductor, and the metal foil (4) becomes a grounding terminal with a (−) load, all resulting in a series connection of 2 condensers between the high voltage cable and the ground.

For example, in the simple high tension capacitor which does not have a lead wire (8), the conductor in the high-voltage cable, or the distributor, bears a (+) load. The outside of the coating and the insulator (1) become inductors, and the metal foil (2) turns out to bear a low (±) load. The insulator (3) becomes an inductor, the metal foil (4) bears a (+) load lower than the metal foil (2) does, the air becomes an inductor, and the casing becomes a grounding terminal with a (−) load and forms a series connection of 3 condensers between the high voltage cable. Together, when a load is charged, these components act as a "smoothing" condenser which corrects voltage drops and fluctuations and so stabilizes the power supply's output voltage.

With a simple, high-tension capacitor constructed as shown, when high-voltage power flows to the high voltage supply cord (12), the generated electrostatic induction induces a potential difference between the power wiring (9) and the wrapper (11), inducing a static capacitance which contains a potential different between the metal foil (2) and the insulator (3), and between the insulator (3) and the metal foil (4). The resulting electrical effect is equivalent to 3 condensers connected in series between the ground and the high voltage supply cord (12). This action can correct power drops and fluctuations under high voltage loads.

When a simple, high-tension capacitor is constructed as shown, the electrostatic induction, generated during a flow of high voltage power, induces a potential difference between the wrapping material (6) and the hollow metal tube (15) inserted into the terminal plug (14). This results in an electrostatic capacitance that has potential differences between the metal foil (2) the insulator (3), the metal foil (4), the insulator (3'), and the metal foil (4'). The resulting electrical effect is equivalent to 2 condensers connected in series. This action corrects power drops and fluctuations under high voltage loads.

When a simple, high-tension capacitor is constructed as shown, the electrostatic induction generated during a flow of high-voltage power, also give rise to a potential difference between the grounding lead wire (8), and the terminal plug (14). Inserted into the hollow metal tube (15), this creates an electostatic capacitance between the metal foil (2), the insulator (3), and the metal foil (4). The resulting electrical effect is equivalent to 2 condensers connected in series. This action corrects power drops and fluctuations under high-voltage loads.

This application gives an example of a practical application for this invention.

FIG. 1 is an oblique view of the body (5) of the high-voltage capacitor. The device consist of aggregated layers; an electrical insulator (1), a metal foil (2), another electric foil (3), and another metal foil (4), laid so that the metal foil (4) shows as the outer layer when the entire body is folded around more than once.

Figure 2:
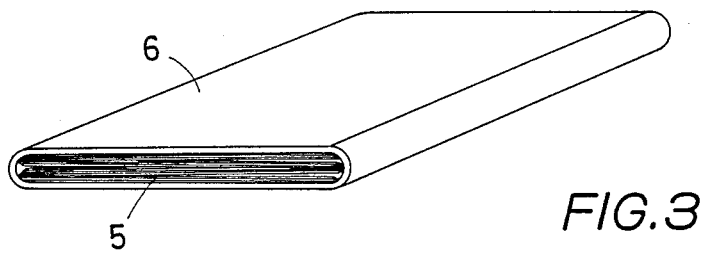
FIG. 2 is an oblique view of the entire capacitor.

FIG. 2 represents the simple, high-tension capacitor of this invention consisting of a condenser body (5) folded in more than one layer and covered with wrapping material (6).

Figure 3:
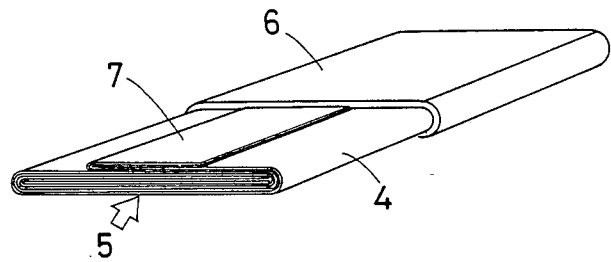
FIG. 3 is an oblique view of the simple high tension capacitor showing a folded over end flap.

FIG. 3 represents an oblique view of the simple, high-tension capacitor in which the electical insulator sheet (1), the metal foil (2), the other electrical insulator sheet (3) and the other metal foil (4) are laid, in the ordinal order in more than one layer to compose the condenser body (5). The body is folded or wound more than once so that the metal foil (4) shows as the outer layer. The end part of the metal foil is folded back and pressed flush at top center of the body to make a folded flap (7). The entire body is coated with wrapping material (6).

Figure 4:
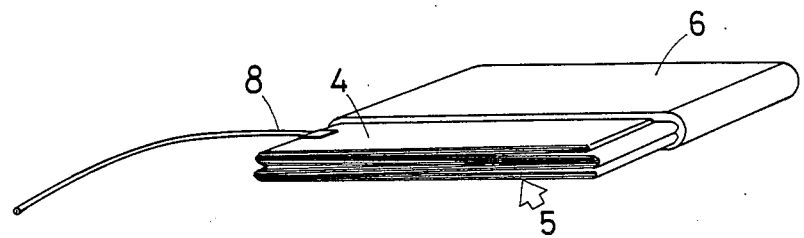
FIG. 4 is an oblique view of the simple, high-tension capacitor showing a lead attached thereto.

FIG. 4 represents an oblique view of the simple high-tension capacitor of this invention. The metal foil (4) is connected with a lead wire (8), and folded more than once around so that the metal foil (4) shows as the outer layer. The entire body is coated with wrapping material (6).

Figure 5:
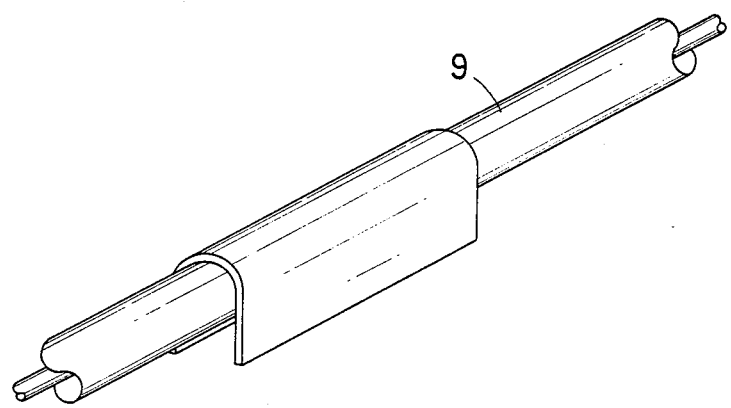
FIG. 5 is an oblique view of the simple, high-tension capacitor folded over a supporting electrical wire.

FIG. 5 is an oblique view to show an example of an application for the simple, high-tension capacitor of this invention. The body of the capacitor is bent and folded for supporting a high voltage cable (9).

Figure 6:
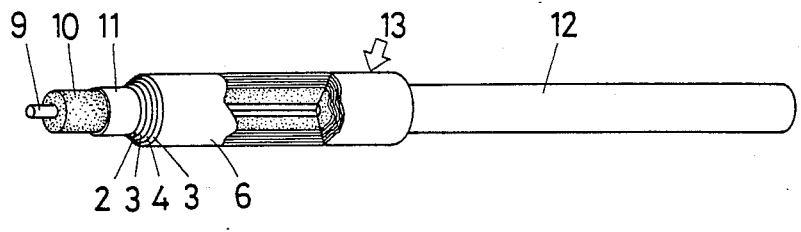
FIG. 6 represents an oblique view, with partial cutoff, of a high-voltage power supply cord with the simple, high-tension capacitor wrapped thereabouts.

FIG. 6 represents an oblique, cross-sectional view of a high-voltage stable power supply cord with the simple high-tension capacitor shown. The high-voltage supply cord (12) consists of a lead wire (9) and an electrical insulator (10). The wrapper (11) is wound with a metal foil (2), an electrical insulator sheet (3), a metal foil (4), and an electrical insulation (3'), all laid in ordinal order. One end is firmly to prevent staggering, making high voltage supply cord (13) with a condenser in it. The entire body is coated with wrapping material (6).

Figure 7:
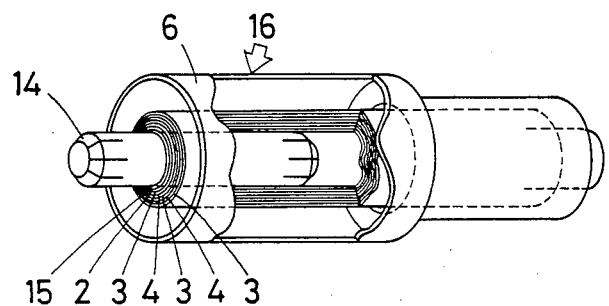
FIG. 7 represents an oblique view, with partial cutoff, of high voltage non-grounding condenser wrapped about terminal plugs.

FIG. 7 represents an oblique view, with a partial cut-off, of a terminal plug with the high-voltage non-grounding condenser (16) shown. The terminal plug (14) is inserted into the hollow metal tube (15), and one end of a metal foil (2) is connected to the periphery of the hollow metal tube (15). An insulator (3), metal foil (4), and insulator (3'), metal foil (4') and insulator (3'), in that order, are wound together and attached to the periphery of the metal foil (2). The entire body is coated with wrapping material (6).

Figure 8:
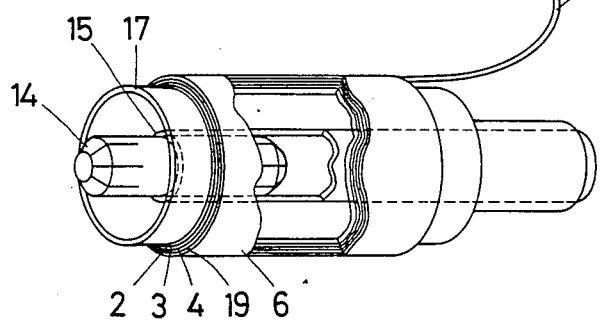
FIG. 8 represents an oblique view, with partial cutoff, of the simple, high-voltage capacitor, wrapped about terminal plugs.

FIG. 8 represents an oblique view, with a partial cut-off, of a terminal plug (18) that has the simple, high-tension capacitor shown. The terminal plug (14) is inserted into the hollow metal tube (15). This hollow metal tube (15) is inserted and joined to the hollow insulator tube (17). The hollow insulator tube (17) periphery is wound with aggregated sheets. A metal foil (2), an insulator (3), a metal foil (4), are then laid in the given order. A grounding lead wire (8) is connected to the metal foil (4), and the metal foil (4) is wound with folds of insulator sheets (19). The entire body is coated with wrapping material (6).

This invention offers effective results as shown in the example practical application shown below.

Example: Application of the simple, high-voltage capacitor of this invention to a high-voltage cable in the ignition system for engines of automobiles, small boats, and generators.

A reduction of voltage drops and fluctuations at the terminals of the ignition plugs results in more powerful sparking and improved combustion of gases inside the engine. There will also be quicker engine starting, faster acceleration, more power in torque and slope climbing. (The power increase is roughly equivalent to that for a change of gear in the transmission.) CO diminishes, so the exhaust gas is cleaner. Less carbon attaches to the ignition plug, and gas consumption drops much as 10% to 20%.

If the high-voltage capacitor is applied to the high-voltage cable of a different electronic apparatus, power drops and fluctuations decrease, making voltage output smoother and more stable. This simple, high-voltage capacitor is easy to use and leads to greater savings of energy.

I claim:

1. A simple, high-tension capacitor has a condenser body (5) that is composed of several sheets; an electrical insulator (1), a metal foil (2), another electrical insulator (3) and another metal foil (4), each sheet is laid one upon the other in a given ordinal order, so that the metal foil sheet (4) shows as the outer layer, the aggregate is wound more than once, an end flap of the metal foil (4) is turned back to make a folded flap, and the body (5) is pressed flat with the folded flap (7) positioned at the top of the body (5), the entire body is coated with wrapping material (6).

2. A simple, high-tension capacitor as claimed in claim 1, further including a lead wire (8) which is fixed to the sheet of metal foil (4) of the condenser body (5), the body (5) being folded into more than one layer and the metal foil (4) being wound more than once around so that it shows as the outer layer.

3. A simple, high-tension capacitor has a condenser body (5) that consists of several sheets, electrical insulator (1), a metal foil (2), another electrical insulator (3) and another metal foil (4); a lead wire (8) that is fixed to the sheet of metal foil (4) of the condenser body (5); said body (5) is folded into more than one layer, the metal foil (4) is would more than once around so that it shows as the outer layer, a flap end of the metal foil (4) is folded back to make a flap (7), said flap (7) is pressed flat and positioned at the top of the body (5), the entire body is wrapped with a coating material (6).

4. A high-voltage, stable power supply cord has a simple, high-tension capacitor, this capacitor consists of aggregated layers; a metal foil (2), an electrical insulator sheet (3), a metal foil (4), and an electrical insulator sheet (3') each laid in ordinal order and wound more than once around the periphery of the existing high-voltage supply cord (12), this cord consists of an electrically conductive wire (9), an insulator (10), and an external wrapper (11), whose lead part is turned back to make a flap (7), the aggregate body (5) is pressed flat with this flap (7) positioned at the top, resulting in a high-voltage supply cord (13) with a simple, high-voltage condenser, the entire body of the high-voltage supply cord, with the condenser (13), is covered with wrapping material (6).

5. A high-voltage, non-grounding capacitor is adapted for use with a terminal plug (16), the terminal plug (14) is inserted into the hollow of a hollow metal tube (15), one end of a metal foil (2) is attached to a periphery of the hollow metal tube (15), the aggregated layers, an electrical insulator (3), a metal foil (4), an electrical insulator (3'), a metal foil (4), a metal foil (4') and an electrical insulator (3'), are laid in that order, wound more than once, and joined to the metal foil (2), together they form a terminal plug (16) with a high-voltage, nongrounding condenser, the periphery of this terminal plug (16) is covered with wrapping material (6).

6. A simple, high-tension capacitor adaptable for use with a terminal plug, the terminal plug (14) is inserted into a hollow metal tube (15), this metal tube (15) is inserted and joined to a hollow insulator tube (17), the periphery of this insulator (17) is wound with aggregated layers, a metal foil (2), an electrical insulator (3), and a metal foil (4), laid in a given order, together they form a terminal plug (18) with a condenser in it, a grounding lead wire (8) is joined to one end of the metal foil sheet (4), and an electrical insulator (19) is wound around the metal foil (4), all of these components are covered with wrapping material (6).

* * * * *